(12) United States Patent
Friend

(10) Patent No.: US 9,803,477 B2
(45) Date of Patent: Oct. 31, 2017

(54) FIBER OPTIC SHAPE SENSING ADAPTED TO CUTTER MODULE OF HIGHWALL MINER

(71) Applicant: Caterpillar Inc., Peoria, IL (US)

(72) Inventor: Paul R. Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 422 days.

(21) Appl. No.: 14/506,989

(22) Filed: Oct. 6, 2014

(65) Prior Publication Data

US 2016/0097277 A1    Apr. 7, 2016

(51) Int. Cl.
| | |
|---|---|
| *E21C 35/24* | (2006.01) |
| *E21C 27/24* | (2006.01) |
| *E21C 35/00* | (2006.01) |
| *E21C 25/00* | (2006.01) |
| *E21C 27/02* | (2006.01) |
| *G01B 11/16* | (2006.01) |
| *G01D 5/353* | (2006.01) |

(52) U.S. Cl.
CPC ............. *E21C 35/00* (2013.01); *E21C 25/00* (2013.01); *E21C 27/02* (2013.01); *E21C 27/24* (2013.01); *E21C 35/24* (2013.01); *G01B 11/18* (2013.01); *G01D 5/35316* (2013.01)

(58) Field of Classification Search
CPC ......... E21C 35/24; E21C 27/24; G01B 11/14; E21B 47/02216; E21B 47/024; E21B 47/123
USPC ....................................................... 356/614
See application file for complete search history.

(56) References Cited

U.S. PATENT DOCUMENTS

| | | | |
|---|---|---|---|
| 4,014,574 A * | 3/1977 | Todd ....................... | E21C 27/24 175/61 |
| 4,884,847 A | 12/1989 | Bessinger et al. | |
| 5,110,189 A | 5/1992 | Haines et al. | |
| 5,295,733 A | 3/1994 | LeBegue | |
| 5,848,825 A * | 12/1998 | Antoline ................ | B65G 15/24 198/606 |
| 7,715,994 B1 | 5/2010 | Richards et al. | |
| 8,116,601 B2 | 2/2012 | Prisco | |
| 8,622,481 B2 | 1/2014 | Niederriter et al. | |
| 2006/0038438 A1* | 2/2006 | Mraz ....................... | E21C 25/58 299/30 |
| 2007/0035171 A1* | 2/2007 | Baird, Jr. ................ | E21C 27/24 299/18 |
| 2009/0116000 A1* | 5/2009 | Kiddy ..................... | E21B 47/00 356/73.1 |
| 2012/0073804 A1* | 3/2012 | Harman ................ | E21B 43/128 166/250.01 |

(Continued)

*Primary Examiner* — David Bagnell
*Assistant Examiner* — Michael Goodwin
(74) *Attorney, Agent, or Firm* — L. Glenn Waterfield; Timothy A. Parker

(57) ABSTRACT

A system for determining the position and orientation of a cutter module relative to a frame of a highwall miner is provided. The cutter module is attached to the highwall miner by a string of push beams and moveable relative to the highwall miner. A reel is rotatably mounted to the highwall miner frame and configured to feed out a hose chain that supplies fluid to the cutter module. A fiber optic shape sensing system is associated with the cutter module is configured to receive strain information from the fiber bundle and compute the location of at least one position of the fiber bundle that is associated with the cutter module relative to the reference frame.

17 Claims, 3 Drawing Sheets

(56) References Cited

U.S. PATENT DOCUMENTS

2013/0308138 A1  11/2013  Hooft et al.

* cited by examiner

FIBER OPTIC SHAPE SENSING ADAPTED TO CUTTER MODULE OF HIGHWALL MINER

TECHNICAL FIELD

This disclosure relates generally to a position determination system for the cutter module of a highwall miner, and more particularly to systems and methods for determining a position and orientation of a cutter module using a fiber optic shape sensing system.

BACKGROUND

Highwall mining is a method for mining coal from exposed seams. In this method of mining, an unmanned cutter module is driven underground and operated in front of the highwall. The highwall mining machine stands on the pit floor or on a bench, directly in front of the exposed seam and makes long parallel rectangular drives into the coal seam.

A remote-operated cutter module is pushed into the seam by a string of push beams (unmanned coal-conveying elements) that transport the mined coal back to the entry of the drive onto a stockpile. The whole mining cycle is completed by a three- or four-man crew, with no personnel going underground at any time.

Current highwall miners use fiber optic gyros to determine the position and orientation of the cutter module relative to the highwall miner frame. Accurate information regarding the position of the cutter module is needed so the cutter module can follow the coal seam. Accurate information is also needed to prevent cutting into previously mined drives, optimize pillar width, and optimize coal recovery. Some highwall miners use radiation sensor to help keep the cutting module in the seam.

The highwall miner is configured to add box-like sections called pushbeams to form a continuous string that connects the cutter module to the highwall miner. As coal is mined by the cutter module, it is collected into the string of push beams and conveyed back to the highwall miner where it can be piled for collection by loaders and trucks. A stack of dozens of pushbeams is provided to the highwall miner. Push beams are added to the string as the cutter module gets deeper and deeper into the coal seam. The push beam string and cutter module can penetrate as deep as 300 m into the coal seam.

A highwall miner typically provides pressurized hydraulic fluid and water to the power head and cutter module. The hydraulic fluid provides power for the cutter module while the water cools the cutting bits and flushes material away from the cutting bits.

Providing hoses for hydraulic and water to the power head and cutter module is a challenge because push beams are continually added as the cutter module penetrates into the coal seam. To solve this problem, a large reel is mounted to the highwall miner frame. The hydraulic fluid and water lines are collected into an armored chain that is called the hose chain.

If a system that can provide information on the position and orientation of the cutter module is to be used, there must be a robust way to route the lines associated with the system from the highwall miner to the power head and cutter module.

Mining machines have typically used radio waves to communicate between the base machine and the cutter module. Tunnel boring machines have used a laser beam fixed to a known reference point that transmits light to a reflector mounted on the boring machine. Such a system only works when cutting a straight bore and is not suitable for a machine that must follow an undulating coal seam.

U.S. Pat. No. 5,110,189 to HAINES; MARVIN L. et al., issued May 5, 1992, entitled "Redundant remote control system used on a continuous miner and method of using same," discloses use of a fiber optic line for communicate between a mobile frame assembly and a material dislodging means. However, the fiber optic cable is configured to provide communication and does not supply strain information relating the shape of the fiber optic cable.

SUMMARY OF THE INVENTION

A system for determining a position and orientation of a cutter module relative to a frame of a highwall miner is disclosed. The system comprises a cutter module being attached to the highwall miner by a string of push beams and moveable relative to the highwall miner. A reel is rotatably mounted to the highwall miner frame and configured to feed out a hose chain that supplies fluid to the cutter module. A fiber optic shape sensing system is associated with the cutter module comprises an interrogation module, a reference frame fixed to the highwall miner frame, and a fiber bundle joined to the interrogation module at a proximal end and to the cutter module at a distal end. The interrogation module is configured to receive strain information from the fiber bundle and compute the location of at least one position of the fiber bundle that is associated with the cutter module relative to the reference frame.

In a second aspect of the current disclosure, method for determining the position and orientation of a cutter module relative to a frame of a highwall miner is disclosed. The method comprises providing a fiber optic shape sensing system associated with the cutter module. The method comprises an interrogation module mounted to the highwall miner frame, a reference frame fixed to the interrogation module and highwall miner frame, and a fiber bundle joined to the interrogation module at a proximal end and to the cutter module at a distal end. The method further comprises receiving reflection spectrum information from the fiber bundle in the interrogation module and computing the location of at least one position of the fiber bundle that is associated with the cutter module relative to the reference frame.

In a third aspect of the current disclosure, a highwall miner equipped with a system for determining the position and orientation of a cutter module relative to a frame of the highwall miner is disclosed. The highwall miner comprises a power source, a ground engaging mechanism, a cutter module being attached to the highwall miner by a string of push beams and moveable relative to the highwall miner, a reel rotatably mounted to the highwall miner frame and configured to feed out a hose chain that supplies fluid to the cutter module, and a fiber optic shape sensing system associated with the cutter module. The fiber optic shape sensing system comprises an interrogation module mounted to the frame, a reference frame fixed to the interrogation module and frame, and a fiber bundle joined to the interrogation module at a proximal end and to the cutter module at a distal end. The interrogation module is configured to receive strain information from the fiber bundle and compute the location of at least one position of the fiber bundle that is associated with the cutter module relative to the reference frame.

DETAILED DESCRIPTION

Figure 1:
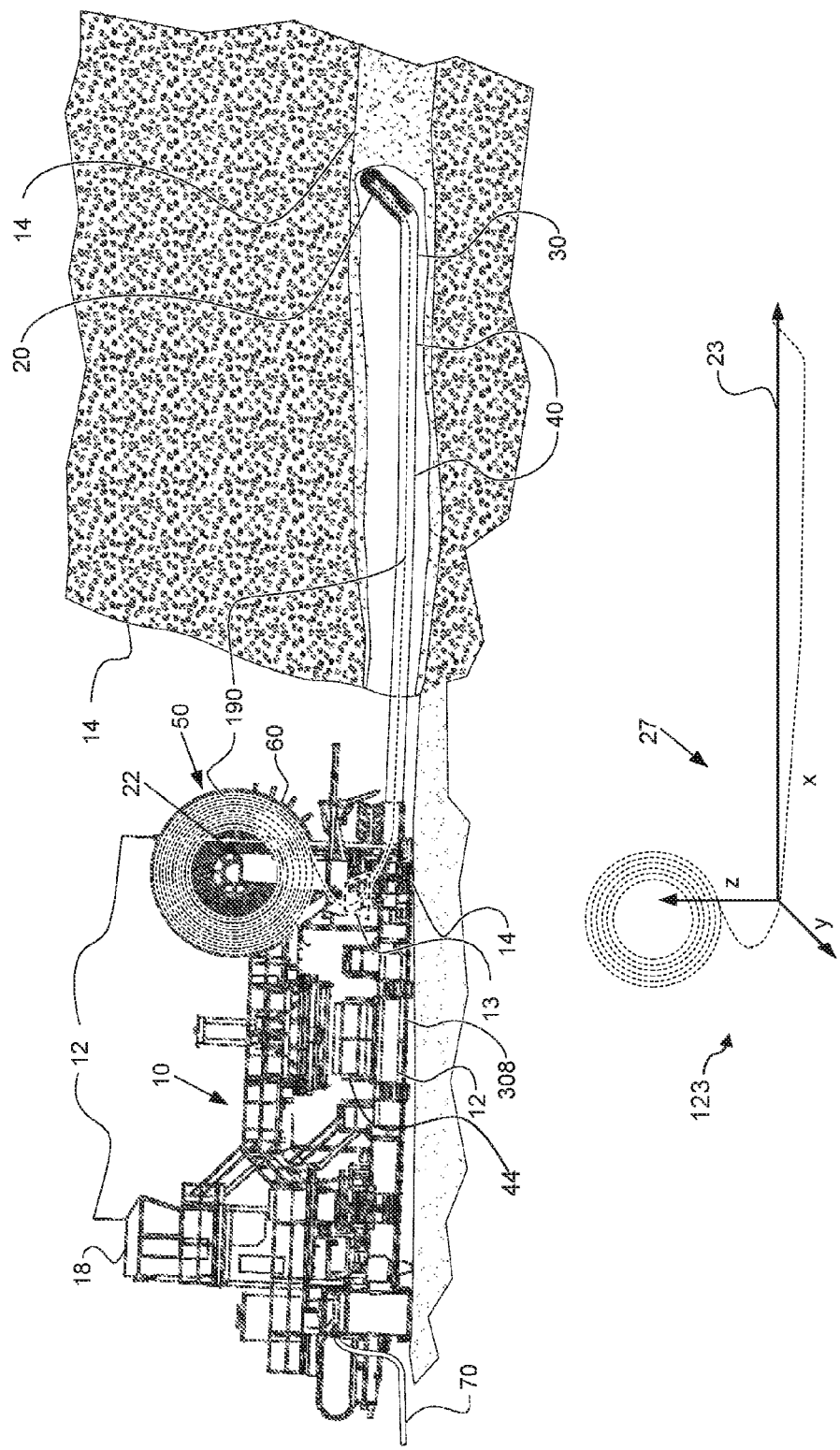
FIG. 1 illustrates a side view of a highwall miner having a fiber optic shape sensing system and a 3D shape reconstruction according to the current disclosure.

This disclosure relates to systems and methods for determining a position on a cutter module 20 relative to a reference position on a highwall miner 10 that operates on a work site. An exemplary embodiment of a highwall miner 10 is shown schematically in FIG. 1. The highwall miner 10 includes a frame 12 that is supported by ground engaging mechanisms 14 which can be wheels or tracks as is known in the art. Motive power for the highwall miner 10 is provided by a power source 70. The power source 70 may be a high voltage power cable supplied by a local or outside utility. In another aspect of the current disclosure, power source 70 may be an engine that provides power to a ground engaging mechanism 14 adapted to support, steer, and propel the highwall miner 10. The power source 70 may embody an engine such as, for example, a diesel engine, a gasoline engine, a gaseous fuel-powered engine, or any other type of combustion engine known in the art. It is contemplated that the power source 70 may alternatively embody a non-combustion source of power (not shown) such as, for example, a fuel cell, a power storage device, or another suitable source of power. The power source 70 may produce a mechanical or electrical power output that may be converted to hydraulic power for providing power to the highwall miner 10 and to other components. The power source 70 may also be an engine-driven generator configured to produce electrical power onboard the highwall miner 10.

The highwall miner 10 further includes a cab 18 that serves as a station for the operator(s). The cab 18 includes operator inputs such as joysticks and switchgear as well as displays and touchscreen displays. The operator inputs are linked to a control system 110 that allows the operator control over the highwall miner 10. The displays provide information from the control system 110 that represents an operating state of the highwall miner 10 as well as diagnostic information.

The cutter module 20 is located at the business end of the highwall miner 10 and includes cutting bits, steering actuators, pitch actuators, a radiation detector, and a gyroscope. The cutter module 20 is in communication with the control system 110 and may use the radiation detector to guide the cutter module 20 through the coal seam 145 by using the pitch and steering actuators, leaving predetermined amounts of coal in the roof and floor. The cutter module 20 receives power from the power head 30. The power head 30 is connected to hydraulic hoses that receive pressurized fluid from a hydraulic system onboard the highwall miner 10. The hydraulic motors on the power head 30 then transmit mechanical power to the cutter module 20. This is typically done via drive chains.

A large reel 50 is rotatably mounted to the highwall miner frame 12. The hydraulic fluid and water lines are collected into an armored chain that is called the hose chain 60. The control system 110 automatically rotates the reel 50 to feed and retract the hose chain 60 as push beams 40 are added and subtracted from the string 42. The reel 50 may hold enough hose chain 60 to extend the string 42 up to 300 m. Water and hydraulic fluid are provided to the rotating reference frame of the reel 50 by means of rotating fluid couplings as is known in the art.

The push beams 40 are rectangular, reinforced steel box structures joined together to form a string 42, which connects the highwall miner 10 to the cutter module 20. The push beams 40 are typically 6 m (20 ft) long or so. The push beam string 42 pushes and pulls the cutter module 20 in and out of the coal seam 145. The push beam 40 conveys mined coal inside. The enclosed push beam 40 protects the coal from contamination and supports the hose chain 60 that supplies control and power to the cutter module 20.

Push beam 40 features include a strong method of attachment that is secured and disengaged quickly and is free of electrical and hydraulic connections. The push beam 40 includes a connection that is horizontally rigid and vertically hinged, allowing the string 42 and cutter module 20 to navigate through coal seam 145 rolls and undulations, A limited number of push beams 40 are stored aboard highwall miner 10. The highwall miner 10 includes a special push beam handling system 44 to add and remove push beams 40 to and from the string 42. Additional push beams 40 can be stacked and stored near the highwall miner 10.

A position determining system 122 adapted to receive and process position data or signals may be mounted to the frame 12 of the highwall miner 10. The position determining device 122 may be a global position satellite (GPS) system receiver. The GPS receiver, as is well known in the art, receives signals from a plurality of satellites and responsively determines a position of the receiver in a site coordinate system 123 relative to the worksite, that is, in a site coordinate system. The site coordinate system 123 may be a Cartesian system having an x-coordinate, a y-coordinate, and a z-coordinate. In alternative embodiments, the position determining system 122 may include other types of positioning systems without departing from the scope of this disclosure, such as, for example, laser referencing systems. The position determining device 122 may include two or more GPS receivers without departing from the scope of the current disclosure. Locations of multiple GPS are fixed and known and their locations may be provided to the controller 304 and fiber optic shape sensing system 260.

The highwall miner 10 further includes a control system 110 operatively connected to the input device and to the push beam handling system 44, steering actuators, and pitch actuators for controlling movement of the cutter module 20. The control system 110 may direct the cutter module 20 to move to a predetermined or target position in response to an operators' desired movement of the cutter module 20 for engaging the cutter module 20 with the coal seam 145 of the worksite. The control system 110 may further direct the cutter module 20 to move to a predetermined or target position indicative of an automatically determined movement of the cutter module 20, based in part on, for example, an engineering or site design, a productivity or load maximizing measure, or a combination of site design and productivity measure.

To direct the cutter module 20 to move precisely in response to an automatically determined movement signal or command, the control system 110 may require certain predetermined measurement data associated with the highwall miner 10 and may need to perform certain predetermined calibrations on other systems and components associated with operating the highwall miner 10.

Figure 2:
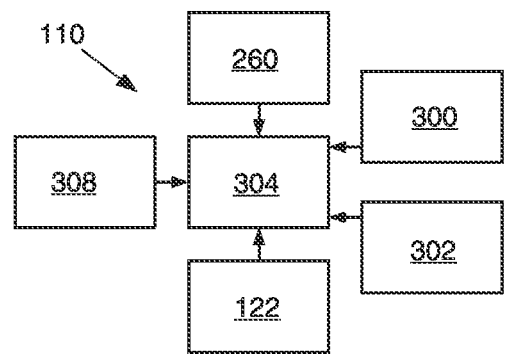
FIG. 2 illustrates an control system according to the current disclosure.

As illustrated in FIG. 2, the control system 110 includes at least one sensor 300 operatively connected to or associated with the cutter module 20, such as, for example, an inclination sensor, at least one sensor 302 operatively connected to or associated with the cutter module 20, such as, for example, a rotation angle sensor, translational motion, or a gravitational referenced inclination sensor, or an inertial measurement unit (IMU) 308, and a controller 304. An IMU 308 is an electronic device that measures and reports a machine's velocity, orientation, and gravitational forces, using a combination of accelerometers and gyroscopes. The controller 304 is adapted to receive inputs from the input device, the position determining system 122, and the sensors 300, 302. The control system 110 is further adapted to control or direct the movement of the cutter module 20 based on the inputs from the input device, the position determining system 122, and the sensors 300, 302. One such sensor 300 may be a ground speed sensor onboard the highwall miner 10 such as a RADAR unit configured to detect ground speed. In another aspect of the current disclosure, ground speed may be calculated from Doppler GPS.

Figure 3:
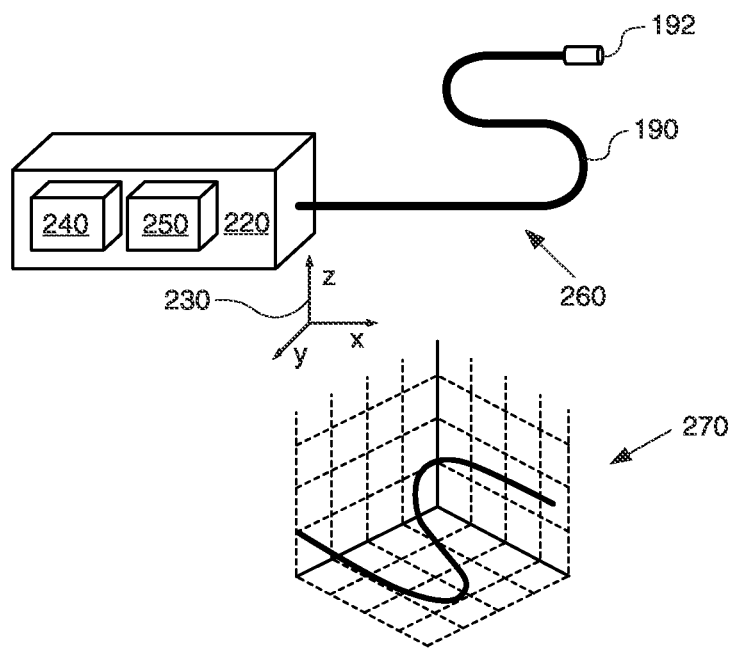
FIG. 3 is a functional illustration of a fiber optic shape sensing system and an exemplary 3D shape representation according to the current disclosure.

FIG. 3 is a view of fiber optic shape sensing system 260. The fiber optic shape sensing system 260 includes a fiber bundle 190, an interrogation module 220, and a signal condition module 240. A representative reference frame 230 is shown, which is fixed to the interrogation module 220. The fiber bundle 190 is joined to the interrogation module 220 at a proximal end and includes a fiber termination 192 at a distal end. Interrogation module 220 is a device that is configured to transmit light to the fiber bundle 190 and receive reflected light from the fiber bundle 190 and provide 3D shape reconstruction 270. Information from the 3D shape reconstruction 270 is provided to signal condition module 240 which provides the location of at least one position of the fiber bundle 190 relative to the reference frame 230.

Figure 4:
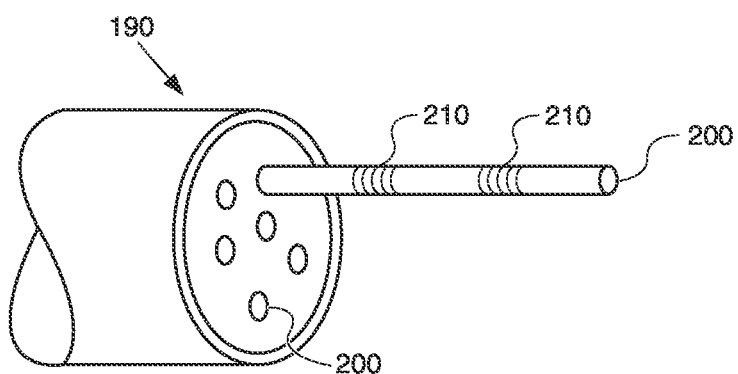
FIG. 4 is a functional illustration of a fiber bundle according to the current disclosure.

FIG. 4 is a view of an optical fiber bundle 190 including a multitude of fiber cores 200. A detailed view of a fiber core 200 is included for the sake of illustration. Two fiber Bragg gratings (FB Gs) 210 are shown formed into the fiber core 100 which are illustrative of many such FBGs 210 typically formed along the full length of a fiber core 200.

It is known that each of the FBGs 210 may be interrogated for strain information. A fiber bundle 190 may contain two or more fiber cores 200 and the FBGs 210 in each fiber core 200 are located at the same length along the fiber core 200. As the index of refraction of a medium depends on stress and strain, the bend direction and axial twist of the fiber core 200 may be determined from the strains in each core's FBG 210. From the strain information from each fiber core 200 at each FBG 210 location along the length of the fiber core 200 the shape of the fiber core 200 can be determined.

A curvilinear coordinate system is defined with an origin at the proximal end of the fiber bundle 190 where it is joined to an interrogation module 220. A fiber termination 192 is located at the distal end of the fiber bundle 190. A Cartesian coordinate system is also defined as a base reference frame 230 having an origin coincident with the curvilinear coordinate system's origin.

To determine the approximate shape of the fiber core 200, the strain information measured at each FBG 210 location is used to determine the approximate local bend for the length of fiber core 200 without FBG 210. For example, the strain information from three fiber cores 200 in a fiber bundle 190 is used to compute the plane and the bend radius of the fiber bundle 190. Segments are defined at various locations along the fiber bundle 190, and each segment ends at a co-located ring of FBG 210 in the three fiber cores 200. Given the Cartesian x,y,z position of the FBG 210 ring being processed (i.e., the segment end position), the position of the next FBG 210 ring can be computed with simple geometry. The position of the first segment's end location with respect to the base frame 230 is then determined from the first segment's bend information. Next, strain information for the second segment is processed to determine the second segment's bend. The second segment's bend information is combined with the position of the first segment's end location to determine the second segment's end location position with respect to the base frame. Thus the position of each segment end location is determined with respect to the base frame 230, and the position information is used to determine the approximate shape of the fiber bundle 190. Accordingly, the position of multiple points along the fiber bundle 190, including the fiber termination 192, relative to the base frame 230 can be determined. An example of a 3D representation of the shape of the fiber bundle 190 is shown in FIG. 3.

A second use of FBG 210 for the present disclosure employs Optical Frequency Domain Reflectometry (OFDR). This approach uses low reflectivity gratings all with the same center wavelength and a tunable laser source. The FBGs 210 may be located on a single optical fiber core 200. This allows hundreds of strain sensors to be located down the length of the fiber core 200. This configuration allows strain measurements to be acquired at much higher spatial resolution than other current sensor technologies, making it flexible enough to employ a user-selected grating density depending on the type of application.

The principles of operation of the fiber shape sensing concept are known and can be found in U.S. Pat. No. 8,116,601 to Prisco, issued Feb. 14, 2012, entitled "Fiber optic shape sensing," United States Patent Publication No. 2013/0308138 to 'T Hooft et al., issued Nov. 21, 2013, entitled "FIBER OPTIC SENSOR FOR DETERMINING 3D SHAPE," and U.S. Pat. No. 7,715,994 to Richards et al., issued May 11, 2010, entitled "Process for using surface strain measurements to obtain operational loads for complex structures."

Referring to FIG. 4, the interrogation module 220 is a device that is configured to transmit light to the fiber bundle 90 and receive reflected light from the fiber bundle 190. The interrogation module 220 may use a laser as a light source. The interrogation module 220 may also contain a microprocessor, a storage medium such as magnetic, optical, or solid state, and input/output circuitry. The interrogation module 220 may also include a 3D shape reconstructor 250. A 3D shape reconstructor 250 is a system or device configured to receive reflection spectrum data from the interrogation module 220 and generate local strain data as a function of position along fiber bundle 190. Accordingly, the 3D shape reconstructor 250 translates the reflection spectrum data into a 3D shape of the fiber bundle 190. The interrogation module 220 may also include a signal conditioning module 240. A signal conditioning module 240 is a system or device configured to receive the reflection spectrum data from the interrogation module 220 and provide a signal indicative of the position and orientation of cutter module 20. The signal conditioning module 240 may contain a 3D shape reconstructor 250. The signal conditioning module 240 may also contain microprocessor, a storage medium such as magnetic, optical, or solid state, and input/output circuitry.

Figure 5:
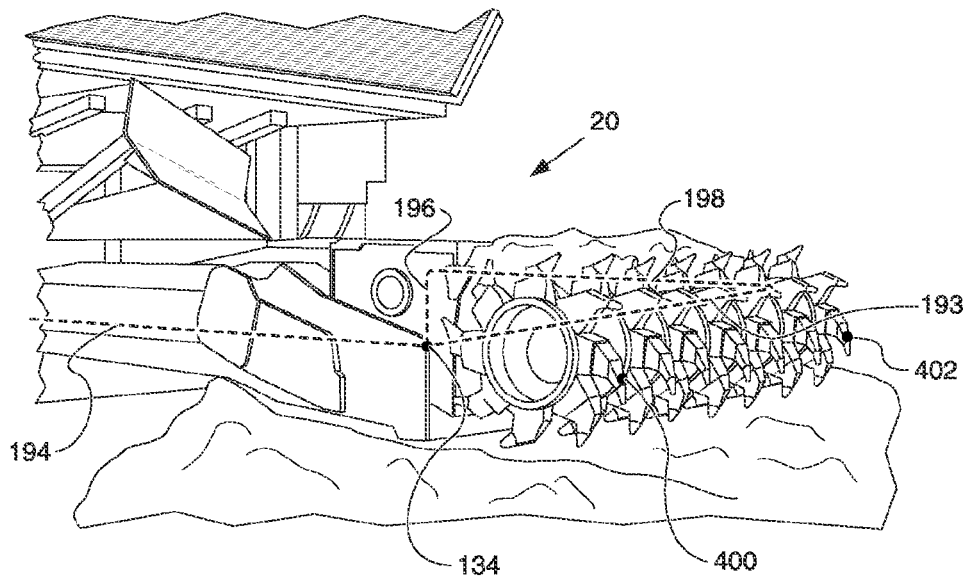
FIG. 5 illustrates a cutter module according to the current disclosure.

A fiber optic shape sensing system 260 as applied to a cutter module 20 of a highwall miner 10 is illustrated in FIGS. 1 and 5. The interrogation module 220 is in communication with the position determining system 122 and the control system 110. The interrogation module 220 is mounted to the frame 12 such that they are fixed to the same reference frame 230. The interrogation module 220 can be mounted to a frame member of the frame 12 or a guard or bracket such that the interrogation module 220 is mechanically grounded to the frame 12. Fiber bundle 190 is joined to the interrogation module 220 at a proximal end and to the cutter module 20 at a distal end. The proximal end of the fiber bundle 190 may of course be attached to a frame, arm, or linkage of the cutter module 20 without departing from the scope of the current disclosure. The fiber bundle 190 may be attached to a cutter module reference point 136 that is located on the cutter module 20. The cutter module reference point 136 is any fixed point located on the cutter module 20 that makes a convenient point to determine movement of the cutter module 20 relative to the frame 12.

As shown in FIG. 1, the location the position determining system 122 relative to the interrogation module 220 on frame 12 is known. The relative distance is fixed and known and can be represented by dimensions A, B, and C in a Cartesian coordinate system (C is out of plane and not shown). These dimensions may be values entered into the memory of controller 304 by the factory or may be entered by a technician during a calibration process.

The fiber bundle 190 is comprised of a connecting section 194 that spans the distance between the highwall miner 10 and the cutter module 20. The relative position of the proximal end and distal end of the connecting section 194 will change as the cutter module 20 is lifted, lowered, extended and retracted. The change in relative position can be determined by the interrogation module 220 and a signal corresponding to the position of the cutter module 20 relative to the frame 12 is generated and communicated to the position determining system 122 and the controller 304. The position of the cutter module 20 relative to the frame 12 is thereby determined at any position as the cutter module 20 is lifted, lowered, extended and retracted.

The fiber bundle 190 may be further comprised of a vertical section 196 that is mounted to the cutter module 20. The relative position of the proximal end and distal end of the vertical section 196 will change as the cutter module 20 is pitched fore and aft. The change in relative position can be determined by the interrogation module 220 and a signal corresponding to the position of the cutter module 20 relative to the frame 12 is generated and communicated to the position determining system 122 and the controller 304. The pitch position of the cutter module 20 relative to the frame 12 is thereby determined at any position as the cutter module 20 is pitched fore and aft.

The fiber bundle 190 may be further comprised of a horizontal section 198. The relative position of the proximal end and distal end of the horizontal section 198 will change as the cutter module 20 is angled about the yaw axis. The change in relative position can be determined by the interrogation module 220 and a signal corresponding to the position of the cutter module 20 relative to the frame 12 is generated and communicated to the position determining system 122 and the controller 304. The yaw position of the cutter module 20 relative to the frame 12 is thereby determined at any position as the cutter module 20 is angled about the yaw axis.

It will be understood by a person skilled in the art that the vertical section 196 and the horizontal section 198 can be positioned in any order along the fiber bundle 190.

In one aspect of the current disclosure, the fiber bundle 190 may be comprised of a diagonal section 193 rather than a vertical section 196 and a horizontal section 198. The proximal end of the diagonal section 193 is joined to the distal end of the connecting section 194 and the distal end of diagonal section 193 is located at a different location on the cutter module 20.

The distal end of the diagonal section 193 should be placed a distance from the proximal end of the diagonal section 193 along the plane generally orthogonal to the direction that cutter module 20 travels as it is extended into the coal seam (y-z plane in FIG. 1). The location of the distal end of diagonal section 193 should be such that it is displaced by a measurable distance along each axis of the plane defined by the cutter module 20. The length of the diagonal section 193 can be any number of lengths, but should be long enough such that pitch and yaw angle movement of the cutter module 20 can be measured by the fiber optic shape sensing system 260.

The fiber bundle 190 may be routed any number of ways, such that the interrogation module 220 is mounted to the frame 12 and the distal end of the fiber bundle 190 is mounted to the cutter module 20.

The fiber optic shape sensing system 260 may further include a reference portal 130 as is shown in FIG. 1. The reference portal 130 is mounted to frame 12 at a fixed and known location and provides a convenient physical feature the fiber bundle 190 to interact with that is detectable by the interrogation module 220. As the length of fiber bundle 190 is fed out as the string 42 is extended, the inflection point 280 can be detected by the interrogation module 220. Since the location of the reference portal 130 is known, the position of the cutter module 20 relative to the frame 20 can be determined. The inflection point 280 can be calculated by taking the $2^{nd}$ derivative of the function described by the 3D shape reconstruction, reducing the function to splines, or by using other algorithms as is known in the art. The reference portal 130 can be any mechanism that can be fixed to the frame 12 and can interact with the fiber bundle 190 as it is fed out and reeled in. Examples of such mechanisms include a simple bar, a roller, or a pair or more of rollers such as cable guides that are known in the art. The reference portal 130 may include a series of features, such as rollers, to form the fiber bundle 190 into a predetermined shape as it passes over that may be detected by the interrogation module 220, such as an "S" shape or the like. The fiber bundle 190 may be fed out and retracted as part of the hose chain 60.

Thus, if the interrogation module 220 cannot be rigidly mounted to a fixed and known location, the fiber optic shape sensing system 260 can still provide information as to the position and orientation of the cutter module 20 relative to the frame 20.

INDUSTRIAL APPLICABILITY

Highwall miners 10 are configured to mine coal from exposed seams. An unmanned cutter module 20 is driven underground and operated in front of the highwall 140. The cutter module 20 can penetrate the face of the highwall 140 up to 300 m, which makes getting accurate information about the relative position and orientation of the cutter module 20 difficult. The highwall miner 10 stands on the pit floor or on a bench, directly in front of the exposed coal seam 145 and makes long parallel rectangular drives into the coal seam 145. A remote-operated cutter module 20 is pushed into the coal seam 145 by a string 42 of push beams 42 that transport the mined coal back to the entry of the drive onto a stockpile. Information about the locations of previously mined drives, underground obstacles, coal seams 145 and other relevant information can be provided to the control system 110. The information can be gathered by survey methods, core samples, down hole spectroscopy, ground penetrating radar, or the like. The information can be provided relative to the site coordinate system 123.

A fiber optic shape sensing system 260 is adapted to determine the position and orientation of a cutter module 20 relative to a frame 12. A position determining system 122 is mounted to the frame 12 in a place where the GPS receiver associated with the position determining system 122 has a clear line of sight to space. The position determining system 122 may be mounted to the cab 18 or some other convenient location, such as the structure mounting the reel 50. In either case, the position determining system 122 is considered to be fixed and mechanically grounded to the frame 12. In one aspect of the current disclosure, the position determining device 122 may include two or more GPS receivers. The locations of the multiple GPS are fixed and known and their locations may be provided to the controller 304 and fiber optic shape sensing system 260.

The fiber optic shape sensing system 260 includes a fiber bundle 190 that is attached to cutter module 20. There are various ways to route and attach the fiber bundle 190 to the cutter module 20 as can be understood by a person skilled in the art. A few such examples are included in, but not limited to, the description and figures of the current disclosure. The routing and attachment method may be chosen depending on the application and may be physically done in a location such as a factory. Whichever routing and attachment arrangement is chosen, the location of each position of the fiber bundle 190, and thereby each FBG 210, is known relative to the cutter module 20. Therefore, as the orientation of the cutter module 20 changes as it lifts, pitches, and yaws, the shape of the fiber bundle 190 changes in relation to the interrogation module 220. The shape of the fiber bundle 190 can then be determined and communicated to controller 304. Therefore, the position and orientation of the cutter module 20 relative to the frame 12 can be determined.

The locations of the position determining system 122 and the interrogation module 220 are fixed and known. The locations are known by the designers of the frame 12 and the locations are physically fixed at a location such as a factory. The locations can be input into the controller 304. Therefore, the position and orientation of the cutter module 20 relative to the position determining system 122 can be determined. Furthermore, the position and orientation of the cutter module 20 relative to the site coordinate system 123 can be determined.

Desired points 400, 402 on the cutter module 20 may correspond to a cutting or engaging edge. The locations of the desired points 400, 402 in the cutter module 20 are fixed and known. The positions of the desired points 400, 402 relative to the frame 12 and the site coordinate system 123 can be determined. The control system 110 can therefore position the desired points 400, 402 at a predetermined location on the site coordinate system 123.

A predetermined plan for removing coal from the coal seam 145 can be defined by a site manager or back office and communicated to the control system 110. The machine communication system may connect to a site management system and to the control system 110 and may include bidirectional transfer of information about the highwall miner 10 and worksite. The control system 110 can therefore position the cutter module 20 in the proper position to achieve the predetermined plan for removing coal from the coal seam 145 for the cutter module 20 on the work site.

Figure 6:
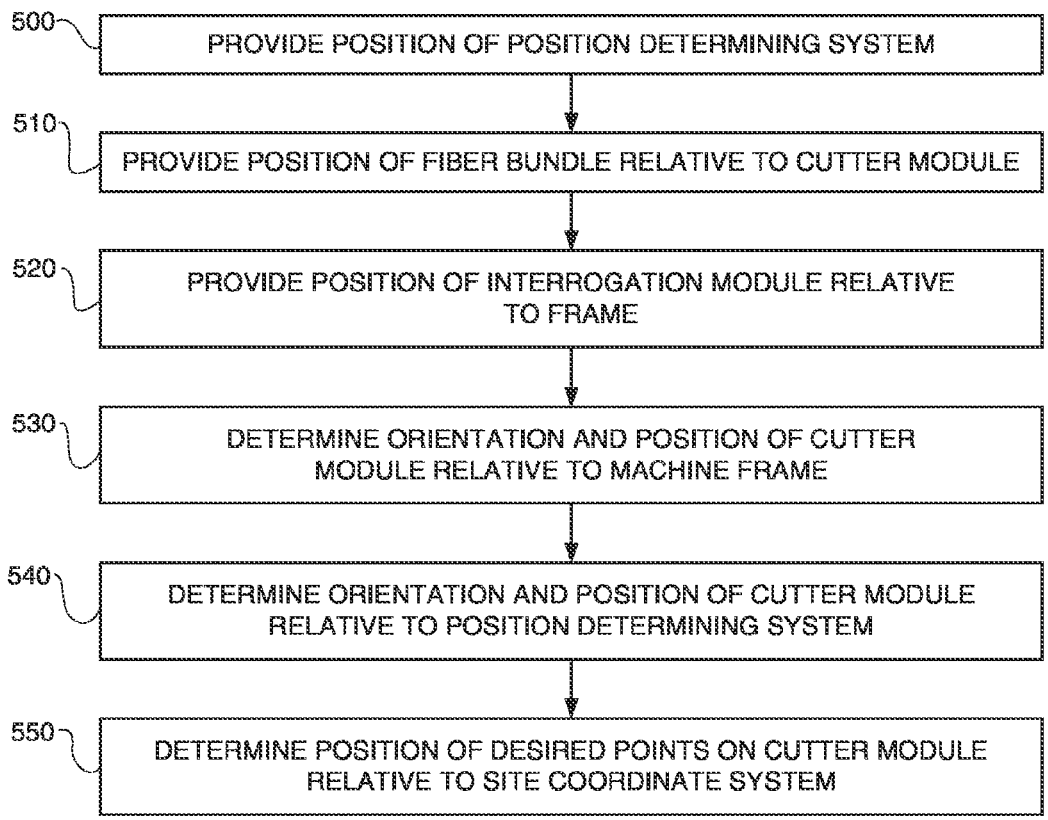
FIG. 6 is a flow chart illustrating an cutter module position determination system according to the current disclosure.

FIG. 6 illustrates exemplary steps to determine the position and orientation of a cutter module 20 relative to a frame 12 according to the current disclosure. In step 500 the position of position determining system 122 relative to the frame 12 is provided to the control system 110. In step 510 the position of the fiber bundle 190 relative to the cutter module 20 is provided to the control system 110. In step 520 the position of the interrogation module 220 relative to the frame 12 is provided to control system 110. In step 530 the orientation of the cutter module 20 relative to the frame 12 is determined. In one aspect of the current disclosure, a further step 540 may include determining the orientation and position of the cutter module 20 relative to the position determining system 122. A further step 550 may include determining the position of desired points 400, 402 relative to the site coordinate system 123.

What is claimed is:

1. A system for determining a position and orientation of a cutter module relative to a frame of a highwall miner comprising:
   said cutter module being attached to said highwall miner by a string of push beams and moveable relative to said highwall miner;
   a reel rotatably mounted to said highwall miner frame and configured to feed out a hose chain that supplies fluid to said cutter module;
   a fiber optic shape sensing system associated with said cutter module comprising:
   an interrogation module;
   a reference frame fixed to said highwall miner frame; and
   a fiber bundle joined to said interrogation module at a proximal end and to said cutter module at a distal end;
   wherein said interrogation module is configured to receive strain information from said fiber bundle;
   a position determining system mounted to said frame of the highwall miner at a fixed known distance from said interrogation module; and
   a controller configured to receive a signal indicative of a highwall miner pitch.

2. The system of claim 1 wherein said fiber bundle includes a horizontal segment associated with said cutter module.

3. The system of claim 1 wherein said fiber bundle includes a vertical segment associated with said cutter module.

4. The system of claim 1 wherein said interrogation module is fixed to said frame and said reference frame.

5. The system of claim 1 further comprising a reference portal fixed to said reference frame and mounted to said highwall miner frame at a predetermined position and configured to receive said fiber bundle;
   wherein said interrogation module is fixed to said reel.

6. The system of claim 5 wherein said reference portal is further configured to receive said hose chain.

7. The system of claim 1, wherein said controller is further configured to:
   receive a signal from the position determining system indicative of a reference point position;

receive a signal indicative of a speed of the highwall miner from said position determining system; and receive a signal indicative of a computed location of at least one position of the fiber bundle that is associated with said cutter module relative to the reference frame.

8. A method for determining the position and orientation of a cutter module relative to a frame of a highwall miner comprising:

said cutter module being attached to and moveable relative to said highwall miner;

providing a fiber optic shape sensing system associated with said cutter module comprising:
  an interrogation module mounted to said highwall miner frame;
  a reference frame fixed to said interrogation module and highwall miner frame; and
  a fiber bundle joined to said interrogation module at a proximal end and to said cutter module at a distal end;

receiving reflection spectrum information from the fiber bundle in said interrogation module;

computing the location of at least one position of said fiber bundle that is associated with said cutter module relative to the reference frame;

providing a position determining system mounted to said frame of the highwall miner at a fixed known distance from said interrogation module;

receiving, in a controller, a signal indicative of highwall miner pitch.

9. The method of claim 8 further comprising computing the locations of multiple positions of the fiber bundle indicative of the position and orientation of said cutter module.

10. The method of claim 9 wherein said fiber bundle includes a horizontal segment associated with said cutter module.

11. The method of claim 9 wherein said fiber bundle includes a vertical segment associated with said cutter module.

12. The method of claim 9 wherein said fiber bundle includes a diagonal segment associated with said cutter module.

13. The method of claim 8 wherein said fiber optic shape sensing system further comprises a cutter module reference point.

14. The method of claim 8 further comprising:

receiving, in the controller, a signal from the position determining system indicative of a reference point position;

receiving, in the controller, a signal indicative of ground speed from said position determining system; and receiving, in the controller, a signal indicative of a computed location of at least one position of the fiber bundle that is associated with said cutter module relative to the reference frame.

15. A highwall miner equipped with a system for determining the position and orientation of a cutter module relative to a frame of said highwall miner comprising:

a power source;

a ground engaging mechanism;

said cutter module being attached to said highwall miner by a string of push beams and moveable relative to said highwall miner;

a reel rotatably mounted to said highwall miner frame and configured to feed out a hose chain that supplies fluid to said cutter module;

a fiber optic shape sensing system associated with said cutter module comprising:
  an interrogation module mounted to said frame;
  a reference frame fixed to said interrogation module and frame; and
  a fiber bundle joined to said interrogation module at a proximal end and to said cutter module at a distal end;
  wherein said interrogation module is configured to receive strain information from said fiber bundle; and a reference portal fixed to said reference frame and mounted to said highwall miner frame at a predetermined position and configured to receive said fiber bundle; wherein said interrogation module is fixed to said reel.

16. The highwall miner of claim 15 wherein said reference portal is further configured to receive said hose chain.

17. The highwall miner of claim 15 further comprising:

a position determining system mounted to said frame of the highwall miner at a fixed known distance from said interrogation module; and a controller configured to:
  receive a signal from the position determining system indicative of a reference point position;
  receive a signal indicative of ground speed from said position determining system;
  receive a signal indicative of highwall miner pitch; and
  receive a signal indicative of a computed location of at least one position of the fiber bundle that is associated with said cutter module relative to the reference frame.

* * * * *